(No Model.)
A. J. CRAIG.
PLOW.
No. 324,660. Patented Aug. 18, 1885.
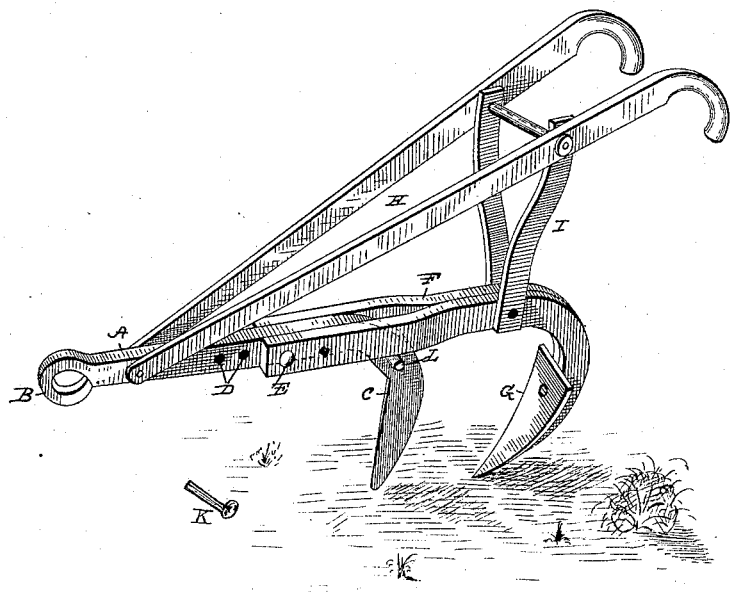
WITNESSES
Edwin L. Yewell
Chas. H. Davis
INVENTOR
A. J. Craig.
By _____
Attorney

UNITED STATES PATENT OFFICE.

ANDREW J. CRAIG, OF HICKORY, MISSISSIPPI.

PLOW.

SPECIFICATION forming part of Letters Patent No. 324,660, dated August 18, 1885.

Application filed April 27, 1885. (No model.)

*To all whom it may concern:*

Be it known that I, ANDREW J. CRAIG, a citizen of the United States, residing at Hickory, in the county of Newton and State of Mississippi, have invented certain new and useful Improvements in Plows, of which the following is a specification, reference being had therein to the accompanying drawings.

My invention relates to improvements in plows, and is designed to produce a device so arranged that a cutter used in front of the plow proper may be adjusted nearer to or farther from it, and that will raise the plow from the ground should it (the cutter) come in contact with an obstruction. A further object is to produce a flexible joint-connection between the plow and the cutter.

In describing the device reference is had to the annexed drawing, which represents a perspective view of the device.

A beam, A, with an eye, hook, or similar device, B, at its forward end, at which point the draft is applied, has its rear end bent downward at an angle, as shown at C, forming thereby a cutter, the front of the same being sharpened. The beam A has a series of holes or perforations, D, in it, any one of which may contain a bolt or pin, E, by means of which the bifurcated ends of a plow-standard, F, is secured to the said beam. The standard F has its rear end bent downward in the proper curve and contains a plow or shovel, G.

Pivoted to the beam A, near its forward end, are handles H, pivotally supported on standards or uprights I, which are in turn pivoted to near the rear of the plow-standard F. The uprights I are a greater distance apart at their upper ends than at the lower, so as to give the handles the proper flare, to make them convenient in operation.

To the rear of the bolt or pin E is a like bolt, K, passing through both standard and beam, and readily removable. This bolt is shown removed and lying under the plow.

At about the curve of the cutter and beam is provided a projecting pin or stop, L.

In operation, should the cutter strike an obstruction it will act as a fulcrum, lifting the plow from the ground. When the bolt K is removed, the standard and beam are connected by a flexible joint, the depth to which the cutter or plow enters the ground being easily regulated by the handles.

The pin L prevents the cutter moving upward to too great an extent.

By means of the holes D the plow and cutter may be relatively adjusted.

I claim—

1. A plow having a beam carrying a cutter, and a standard carrying the plow proper, adjustably and flexibly connected, and having handles pivoted to the beam and supported pivotally by pivoted uprights attached to the standards, substantially as and for the purpose specified.

2. A plow having a beam carrying a cutter, and provided with a series of holes or perforations, and a stop at the junction of the beam and cutter, a bifurcated plow-standard flexibly and adjustably secured to the beam, a removable bolt, and handles pivoted to near the front of the beam and flaring to the rear, where they are supported by uprights pivotally connected to both handles and standard, substantially as and for the purpose specified.

In testimony whereof I affix my signature in presence of two witnesses.

ANDREW J. CRAIG.

Witnesses:
T. S. GIDDENS,
J. T. MAPP.